United States Patent [19]

McIlroy et al.

[11] Patent Number: 5,634,950
[45] Date of Patent: Jun. 3, 1997

[54] BLACK LIQUOR GASIFIER

[75] Inventors: Robert A. McIlroy, Marlboro Township, Stark County; Robert A. Kuchner, Plain Township, Stark County; John E. Monacelli, Green; Dennis W. Johnson, Barberton, all of Ohio

[73] Assignee: The Babcock & Wilcox Company, New Orleans, La.

[21] Appl. No.: 548,798

[22] Filed: Nov. 2, 1995

Related U.S. Application Data

[63] Continuation of Ser. No. 201,447, Feb. 24, 1994, abandoned.
[51] Int. Cl.$^6$ .................................................. C01J 3/56
[52] U.S. Cl. .................... 48/111; 48/63; 48/64; 48/73
[58] Field of Search ............................ 48/62 R, 63, 64, 48/73, 76, 111, 128, 197 R, 202, 203, 206, 209; 422/142, 146, 185; 162/30.1, 30.11; 55/222; 403/DIG. 3, 215.5

[56] References Cited

U.S. PATENT DOCUMENTS

| | | | |
|---|---|---|---|
| 2,619,451 | 11/1952 | Ogorzaly et al. | 48/206 |
| 2,633,416 | 3/1953 | Gornowski et al. | 48/203 |
| 2,683,657 | 7/1954 | Garbo | 48/206 |
| 2,697,653 | 12/1954 | Nicholson | 422/142 |
| 3,232,029 | 2/1966 | Evans | 95/225 |

(List continued on next page.)

FOREIGN PATENT DOCUMENTS

| | | | |
|---|---|---|---|
| 1089162 | 6/1980 | Canada | 9/36.2 |
| 2069861 | 2/1981 | United Kingdom | F27B 15/00 |

OTHER PUBLICATIONS

Doe Report DOE/CE/40893-T1 (DE 92003672) Feb. 1991.
Garner et al, 1958 J. Appl. Chem., 8 May 1958.
Mansour et al, "Chemical and Energy Recovery from Black Liquor by Steam Reforming", TAPPI Proceedings, 1992 pp. 473–478.
Agha Mohammadi et al, "Testing of a Sludge Gasification Plant at Inland Container's Ontario (California) Mill, "TAPPI Proceedings, 1992, pp. 1167–1179.

(List continued on next page.)

"Utility Seeks to Integrate Heat Recovery Flue Gas Treatment," *Power*, May 1993.
B&W White Paper, 1993.

*Primary Examiner*—Timothy McMahon
*Attorney, Agent, or Firm*—Daniel S. Kalka; Robert J. Edwards

[57] ABSTRACT

A system and method for producing product gas using residual waste liquor is described with a gasifier reactor having a fluidized bed located therein. The gasifier reactor is heated to a predetermined temperature range with either an external heater or a second fluidized bed located at a position below the first fluidized bed. A heat exchanger may be positioned in the first fluidized bed and/or the second fluidized bed for indirectly heating the respective fluidized beds. Condensing heat exchanger means recovers heat from the product gas and condenses an acid gas therefrom for recycling the chemicals. A reagent is sprayed in the condensing heat exchanger means to clean the product gas. Pressurization allows the cleaned product gas to be directly fired in a turbine.

11 Claims, 5 Drawing Sheets

U.S. PATENT DOCUMENTS

| | | | |
|---|---|---|---|
| 3,250,591 | 5/1966 | Bergholm et al. | 23/48 |
| 3,309,262 | 3/1967 | Copeland et al. | 162/30 |
| 3,322,492 | 5/1967 | Flood | 23/46 |
| 3,414,468 | 12/1968 | Copeland | 162/30 |
| 3,471,249 | 10/1969 | Markant et al. | 23/2 |
| 3,523,864 | 8/1970 | Osterman et al. | 162/30 |
| 3,574,051 | 4/1971 | Shah | 162/30 |
| 3,578,396 | 5/1971 | Priestley | 23/48 |
| 3,635,790 | 1/1972 | Heath | 162/30 |
| 3,638,708 | 2/1972 | Farin | 159/47 WL |
| 3,657,064 | 4/1972 | Shick | 162/30 |
| 3,676,064 | 7/1972 | Shick | 23/129 |
| 3,711,593 | 1/1973 | Shick et al. | 423/207 |
| 3,718,446 | 2/1973 | Brink et al. | 48/209 |
| 3,761,568 | 9/1973 | Brink et al. | 423/207 |
| 3,920,417 | 11/1975 | Fernandes | 48/197 R |
| 3,963,426 | 6/1976 | Hand | 48/202 |
| 4,069,024 | 1/1978 | Fernandes | 48/197 R |
| 4,099,933 | 7/1978 | Johnson et al. | 48/202 |
| 4,244,779 | 1/1981 | Nieminen et al. | 162/30.1 |
| 4,303,469 | 12/1981 | DiNovo et al. | 162/30 R |
| 4,312,702 | 1/1982 | Tomlinson | 162/30.1 |
| 4,321,233 | 3/1982 | Tsuji et al. | 422/142 |
| 4,377,439 | 3/1983 | Liem | 162/30.1 |
| 4,431,617 | 2/1984 | Farin | 423/232 |
| 4,439,272 | 3/1984 | Nguyen | 162/30.11 |
| 4,441,959 | 4/1984 | Empie, Jr. | 162/30.1 |
| 4,487,139 | 12/1984 | Warner | 110/345 |
| 4,490,157 | 12/1984 | Fernandes | 48/62 R |
| 4,522,685 | 6/1985 | Feldman | 162/30.11 |
| 4,526,112 | 7/1985 | Warner | 110/345 |
| 4,557,202 | 12/1985 | Warner | 110/216 |
| 4,571,062 | 2/1986 | Weitman | 55/222 |
| 4,577,380 | 3/1986 | Warner | 29/157.3 |
| 4,619,671 | 10/1986 | Ruff et al. | 55/222 |
| 4,669,530 | 6/1987 | Warner | 165/1 |
| 4,674,560 | 6/1987 | Marcellin | 165/1 |
| 4,682,985 | 7/1987 | Kohl | 48/197 R |
| 4,684,375 | 8/1987 | Morin et al. | 48/197 |
| 4,705,101 | 11/1987 | Warner | 165/104.31 |
| 4,773,918 | 9/1988 | Kohl | 162/30.11 |
| 4,776,391 | 10/1988 | Warner | 165/111 |
| 4,799,941 | 1/1989 | Westermark | 95/229 |
| 4,823,739 | 4/1989 | Marcellin | 122/4 D |
| 4,852,344 | 8/1989 | Warner | 60/39.182 |
| 4,979,448 | 12/1990 | Sheely et al. | 110/346 |
| 5,012,750 | 5/1991 | Sheely et al. | 110/245 |
| 5,019,135 | 5/1991 | Sealock, Jr. et al. | 48/197 R |
| 5,028,241 | 7/1991 | Kooiman | 48/128 |
| 5,059,404 | 10/1991 | Mansour et al. | 423/201 |
| 5,064,444 | 11/1991 | Kubiak et al. | 48/202 |
| 5,080,755 | 1/1992 | Backlund | 162/19 |
| 5,080,756 | 1/1992 | Kutney | 162/30.11 |
| 5,089,087 | 2/1992 | Elmore et al. | 162/46 |
| 5,174,860 | 12/1992 | Von Heiningen et al. | 162/30.11 |
| 5,176,109 | 1/1993 | Engstrom | 122/4 D |
| 5,192,396 | 3/1993 | Backlund | 162/19 |
| 5,201,172 | 4/1993 | Hakolin et al. | 60/39.05 |
| 5,205,908 | 4/1993 | Stigsson et al. | 162/30.1 |
| 5,211,002 | 5/1993 | Ruottu | 60/39.02 |
| 5,231,836 | 8/1993 | Saari | 423/234 |
| 5,284,550 | 2/1994 | Tanea et al. | 48/203 |
| 5,368,096 | 11/1994 | Williams | 165/113 |

OTHER PUBLICATIONS

Whitty, "Gasification of Black Liquor Char with $H_2O$ at Elevated Pressures," TAPPI Proceedings, 1992, pp. 627–639.

Frederick et al, "Pressurized Gasification of Spent Pulping Liquors: Thermodynamic & Kinetic Constraints", TAPPI Proceedings, 1992, pp. 617–625.

Bostrom et al, "Status Report from the Chemrec Recovery Booster at Frovifors", TAPPI Proceedings, 1992, pp. 451–455.

Dahlquist et al, "Development of a Dry Black Liquor Gasification Process", TAPPI Proceedings, 1992 pp. 457–471.

Van Heiningen et al, "Effect of Liquor Type and Pyrolysis Rate on the Steam Gasification Reactivities of Black Liquors," TAPPI Proc., 1992, pp. 641–649.

Kinstrey, Robert B., "Tomlinson Recovery Furnace Alternatives," Rust International Corp. OPTEC, pp. 1–8.

U.S. Patent Application Serial No. 08/152,757 filed Nov. 12, 1993.

BLACK LIQUOR GASIFIER

This is a continuation of application Ser. No. 08/201,447 filed Feb. 24, 1994 now abandoned.

BACKGROUND OF THE INVENTION

1. Field of the Invention

The present invention relates, in general, to fluidized bed gasification systems and in particular, to a new and useful self-contained system for gasifying a residual waste such as black liquor.

2. Description of the Related Art

In the pulp and paper production industry, recovery processes are used to generate steam and to recover certain chemicals used in the pulping process.

A common method of chemical recovery used in the Kraft Paper Pulping Process starts with the concentrating of what is known as black liquor. Black liquor is that stream which results from the washing of the pulp after the wood has been digested by the cooking liquor. This stream is rich in valuable chemicals which are recovered to produce some of the basic cooking liquor employed in the digester. This liquor also contains organic material picked up in the digestion process of the prepared woods. In a chemical recovery furnace black liquor, concentrated to approximately 60–80 per cent solids by weight, is sprayed or introduced into the bottom portion of the furnace where smelt is formed. The smelt which is deposited in the bottom part of the furnace can be hazardous. If leaks develop in the water tubes, the probability of an explosion from the contact of the water and smelt is quite high. The flowing smelt is drawn off and treated so as to reconstitute the cooking liquor for the digestion process.

Other approaches to gasifying black liquor include high temperature (>Tsmelt) entrained bed gasifiers and low temperature fluidized bed gasifiers. Some gasifiers directly input heat into the bed material itself, while others provide heat indirectly. Typically low temperature gasifiers provide heat input to the fluidized bed through the use of heat transfer surfaces such as heat exchanger tubes located in the bed material.

An integral part of gasification of fuels containing sulfur, especially black liquor gasification, is heat recovery and sulfur removal from the fuel (product) gas.

Gasification of black liquor is carried out by heating the liquor solids with a sub-stoichiometric amount of oxygen. The gasification products are a product gas stream rich in hydrogen, carbon monoxide, carbon dioxide and hydrogen sulfide and a stream of sodium salts. The sodium salts consist primarily of sodium carbonate with minor amounts of sodium-sulfur and potassium compounds. Most of the sulfur in black liquor is released to the gas phase as hydrogen sulfide in a low temperature gasifier.

Gasifier product gas temperature after typical conditioning, with a waste heat boiler or other heat trap, is 300 F.–400 F. Typical product gas scrubbing temperatures range from 100 F.–180 F. Thus, considerable sensible heat still exists in the product gas. Further, the product gas stream can contain considerable amounts of water vapor. When cooling to the required scrubbing temperature, considerable amount of latent heat is released.

The hydrogen sulfide ($H_2S$) in the gasifier product gas must be removed to produce a clean fuel gas that is suitable to burn in an auxiliary boiler or a gas turbine. The $H_2S$ can be absorbed in a sodium carbonate solution formed by dissolving the solid product from the gasifier. The product solution from the scrubbing process would be a "green liquor" similar to the conventional kraft recovery process green liquor that can be re-used in the pulping process.

It is believed that existing pulp mill chemical solutions can be used as $H_2S$ absorbing solutions. Gases containing both $H_2S$ and $CO_2$ will react with sodium salt solutions. $CO_2$ absorption is not desirable as sodium bicarbonate is formed which will increase causticizing chemical usage and lime kiln capacity. Reaction rate data is limited on $H_2S/CO_2/$ Sodium salt solution scrubbing systems. In U.S. Pat. No. 4,431,617 issued Feb. 14, 1984 and U.S. Pat. No. 3,471,249 issued Oct. 7, 1969, limiting $CO_2$ absorption is discussed. Preferential absorption of $H_2S$ over $CO_2$ is a function of gas velocity, scrubbing temperature, mass transfer device, solution retention time, and scrubbing solution chemistry.

Presently, there is a need for a system and method for gasifying residual waste liquor which produces a product gas with low to medium heating value, and provides a high conversion of carbon and which uses low external heat input. Also, for a device and a process for removing sensible and latent heat from the product gas and controlling the absorption process for selective $H_2S$ absorption. This apparatus and method should operate at a temperature so as not to produce smelt. Preferably, the system would be self-contained and function as a stand-alone system to process a residual waste liquor and generate a product gas for boilers, kilns, diesel generators, or gas turbine. Additionally, it should be environmentally friendly.

SUMMARY OF THE INVENTION

The present invention is directed to the aforementioned problems with the prior art as well as others and to the gasification of residual waste in the pulp and paper industry.

One object of the present invention is to provide a gasifier for black liquor which utilizes a fluidized bed with black liquor sprayed onto the top of the fluid bed.

Another object of the present invention is to provide an apparatus and process for removing sensible and latent heat from the product gas and controlling the absorption process for selective $H_2S$ absorption.

Another object of the present invention is to provide a gasifier for black liquor which produces a product gas.

Another object of the present invention is to provide a gasifier for black liquor which has a high rate of conversion for carbon and requires little if any external heat input.

Another object of the present invention is to provide a gasifier for black liquor with the option of two fluid beds which burns ungasified carbon in the air/steam heating fluidized bed in order to supplement the indirect heat input and increase the overall thermal efficiency of the reactor.

Another object of the present invention is to provide a gasifier for black liquor which disposes of waste streams produced by a paper mill.

Another object of the present invention is to provide a gasifier for black liquor which is reliable and economical.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

In general, the gasification of black liquor is carried out by using a gasifier for heating the liquor solids with a substoichiometric amount of oxygen. The gasification products are a fuel gas stream rich in hydrogen and carbon monoxide and a stream of sodium salts. Because of the well known potential for violent smelt-water reactions, it is desirable to operate the gasifier at low temperatures so as not to produce smelt.

When the gasification is carried out at a temperature below the melting point of the sodium salts, the salts exist in the reactor as a solid phase. The sodium salts consist primarily of sodium carbonate with minor amounts of sodium-sulfur compounds. It is envisionable that other alkali salts would include potassium salts like potassium carbonate. Most of the sulfur in the black liquor is released to the gas phase as hydrogen sulfide in a low temperature gasifier. A fluidized bed reactor with preferably granular sodium carbonate or calcium carbonate as a start-up solid as the bed material is well suited to carry out the low temperature gasification reactions.

If no oxygen is supplied to the reaction zone beyond that in the solids and water phase of the liquor, the process is referred to as pyrolysis. Equilibrium calculations, however, have shown that under pyrolysis conditions large quantities of unreacted carbon remain in the product sodium carbonate stream and the endothermic reaction requires the input of significant quantities of heat.

In order to gasify this residual carbon an additional source of oxygen is required. This oxygen can be supplied by atmospheric air, steam, pure oxygen, malodorous gas, carbon dioxide, or combinations of these gases. It is best to use oxygen ($O_2$) to gasify the black liquor solids, however, due to economic constraints a mixture of air and steam is employed. Direct addition of air to the bed will result in dilution of the product gas with nitrogen but it also supplies part of the heat requirements through partial combustion of a portion of the black liquor solids.

The use of steam leads to higher heating values for the product gas at the expense of greater external heat requirements. The optimum combination of air and steam to provide a product gas with a heating value in the range of 70 to 300 Btu/DSCF (dry standard cubic feet) with minimum external heat input is liquor specific.

Without air or oxygen the overall gasification reactions are endothermic, additional heat must be added to the gasification zone. At high enough fraction of stoichiometric oxygen, combustion of some of the gasification products within the reactor will generate sufficient heat to sustain the process but this tends to produce a product gas with low heating value. A large fraction of the total heat can be added via the gasifying medium, i.e. air or steam heated externally to the gasifier bed, but there is an upper limit to the air/steam temperature to avoid melting of the sodium salts. The remaining heat is added in an indirect manner by a heat exchanger located within the bed.

Figure 1:
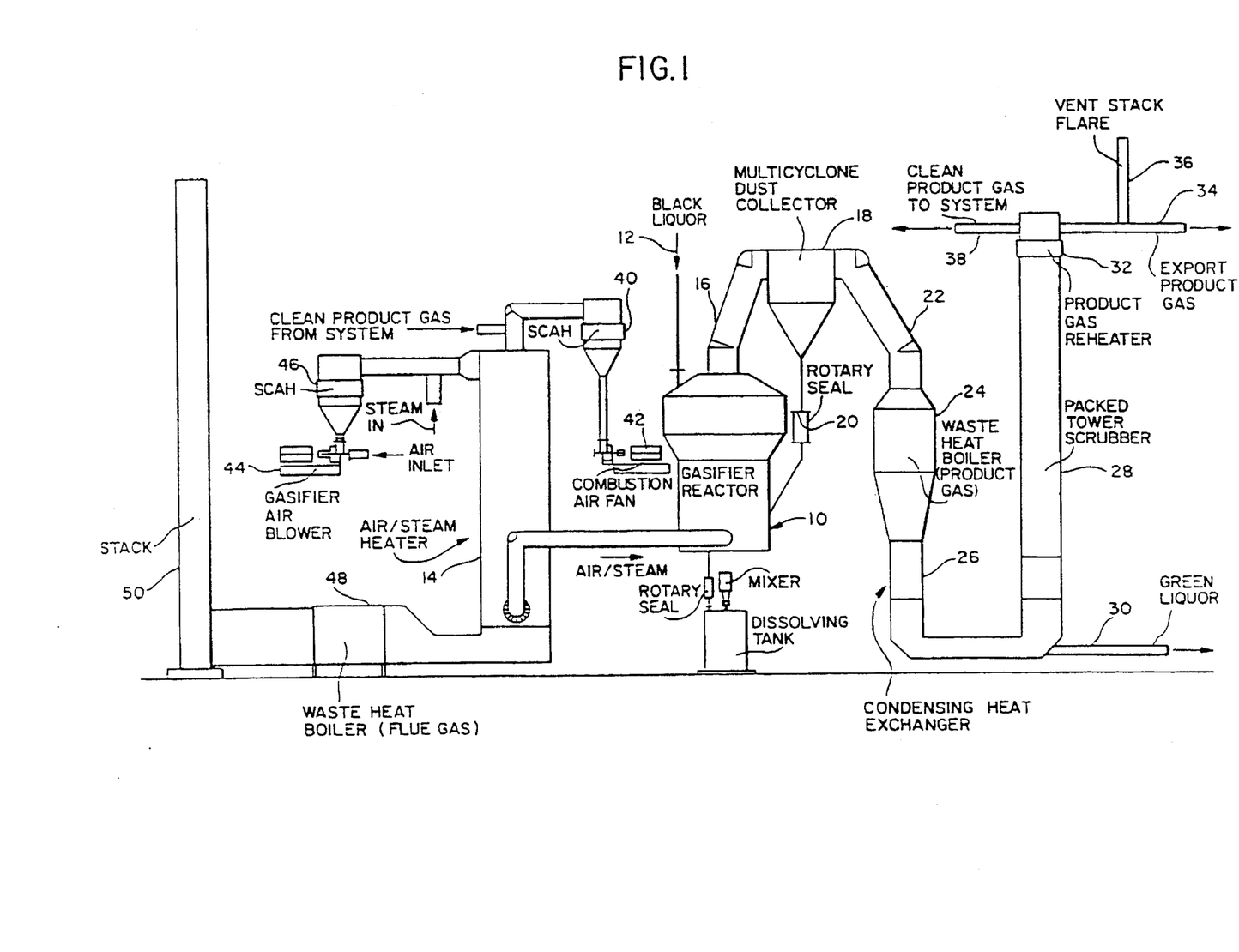
FIG. 1 is a schematic view of the system of the present invention.

As shown in FIG. 1, the system of the present invention comprises a black liquor gasification reactor comprising a reactor, generally designated 10, receiving a supply of black liquor sprayed or injected therein. An air/steam heater (14) provides heat to the gasifier (10) for gasifying the black liquor. The term black liquor as used herein is meant to include a variety of residual waste liquors including but not limited to liquors from wood and non-wood sources (straw, bamboo, bagasse). Any carbonaceous or cellulosic liquor may be used in the system of the present invention.

The product gas from gasifying the liquor exits reactor (10) through a duct (16) to a multicyclone dust collector (18) where dust from the gaseous stream is removed and returned to the reactor through duct (20) which has a rotary seal.

The hot product gas passes through duct (22) into a waste heat boiler (24) which recovers heat from the hot product gas stream to generate low pressure saturated steam. A condensing heat exchanger (26) which will be described in greater detail later is an indirect, counter-flow condensing type heat exchanger used to extract both sensible and latent heat from the product gas stream, serve as a secondary dust/particle collector, and strip some of the hydrogen sulfide from the product gas.

Any remaining hydrogen sulfide, if any, is removed in an optional scrubber (28). The tower (28) is equipped with a high surface area packing or other mass transfer device with associated hardware known in the art. The bottom of the tower (28) is an internal sump for recirculated green liquor (30).

As the product gas exits tower (28), it is reheated in product gas reheater (32) where it is transported to one of several locations. The clean product gas can be exported for combustion (34), flared in vent stack (36), and/or used to provide heat for the system (38).

The clean product gas (38) is mixed with heated combustion air provided through steam coil air heater (SCAH) (40). Fan (42) provides air for combustion in air/steam heater (14). The gasifier air is introduced by fan (44) and heated in SCAH (46) and mixed with steam and then further heated in air/steam heater (14). Waste heat boiler (48) recovers heat from this combustion process to generate steam for use in the system. The flue gas is discharged from stack (50).

Figure 2:
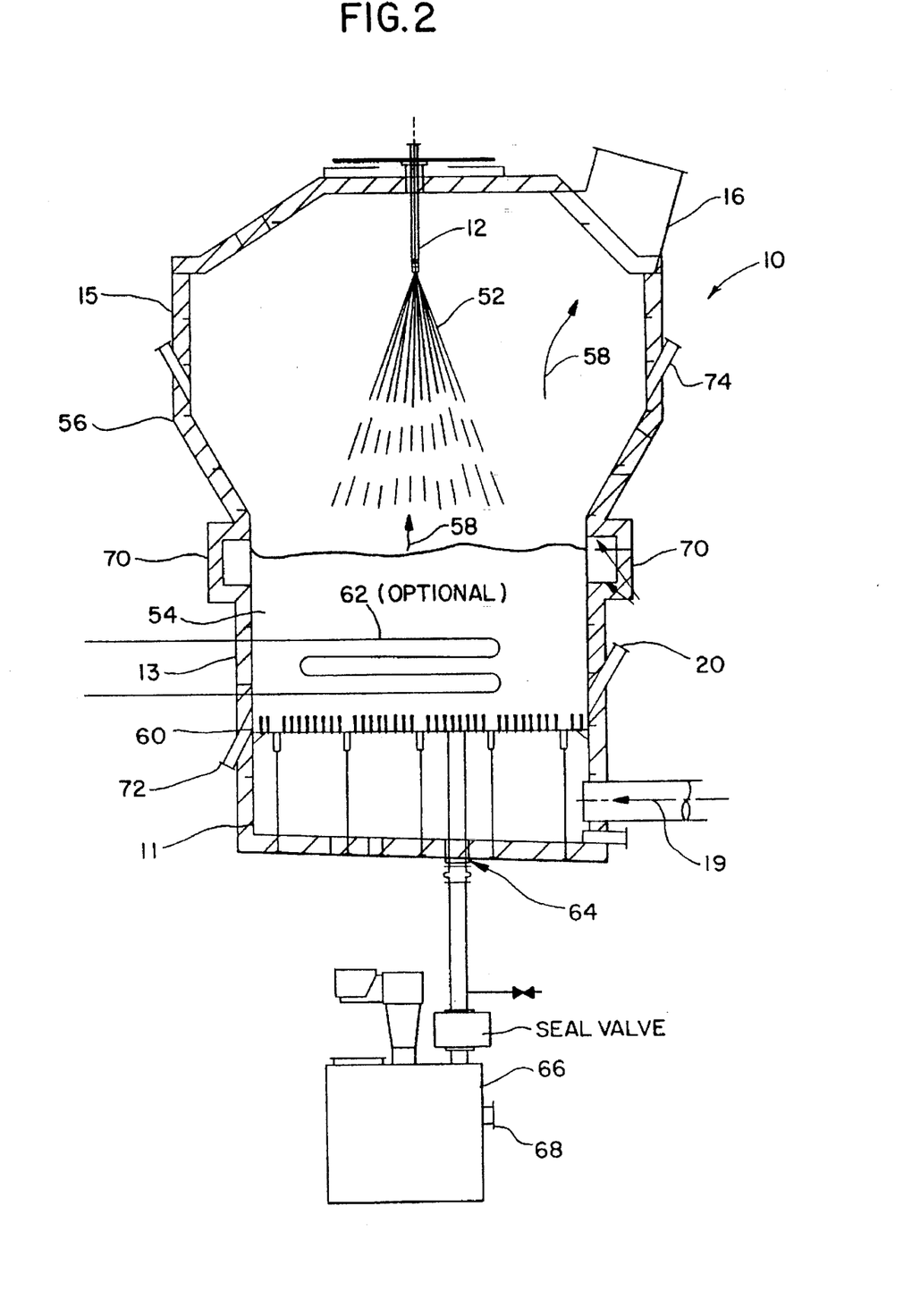
FIG. 2 is a sectional view of the reactor in an embodiment of the present invention.

Referring to FIG. 2, black liquor (52) is provided near the top of reactor 10 with supply means (12) at the low temperature gasifier bed (54) which produces gasification reactions. While supply means (12) is depicted as a nozzle sprayer, any means of introducing the black liquor is suitable whether it is in liquid or dry form. Preferably, it is injected above the bed, but alternately directly into the bed. The gasifier bed comprises sodium salts, preferably sodium carbonate which is formed from the black liquor (52), and operates at an operating temperature range of 900 F. to 1400 F. and preferably at a temperature of approximately 1200 F. This temperature prevents the formation of smelt.

Black liquor (52) is provided at a concentration ranging from 40 to 80% by weight solids, and preferably 65%–75% by weight solids, and is sprayed or injected into the freeboard (56) above fluidized bed (54) where the black liquor (52) contacts the hot product gas (58) leaving bed (54) which produces the gasification reaction. If a powdered form (dried black liquor) is available, it may be pneumatically injected directly into gasifier bed (54). The black liquor (52) is further concentrated while cooling the gas (58). This increases the efficiency of the process since heat used to evaporate water is supplied at a lower temperature than the heat added to bed (54) through perforated plate (60) with the bubble caps contained therein, or by a heat exchanger optionally located in bed (54). The product gas (58), after leaving the reactor 10, is treated in the manner previously described in FIG. 1.

The material of bed (54) has a melting point ranging approximately 1400 F to 1550 F. depending on the amount of sulfur, potassium and chloride impurity in the black liquor (52). Thus, the surface of an in-bed heat exchanger (62) if employed should remain below this temperature range in order to prevent melting of particulate at the heater surface, and formation of smelt. This is because localized melting at the heat exchanger (62) causes particles to adhere to the surface of the heat exchanger (62) and thus reduces the efficiency of the heat transfer surface which can lead to complete defluidization of the bed (54).

Figure 3:
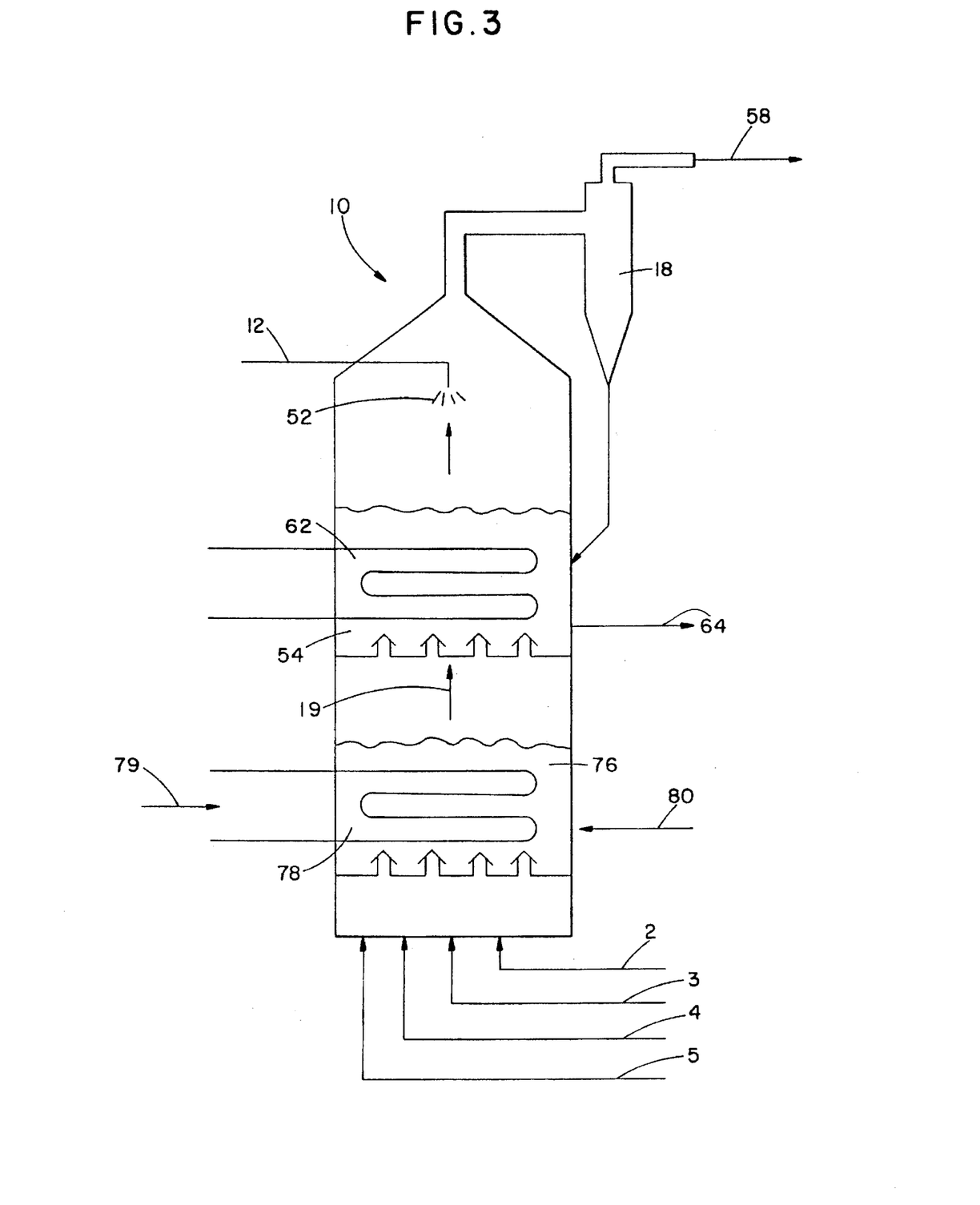
FIG. 3 is a sectional view of an alternate embodiment of a reactor of the present invention.

When a heat exchanger (62) is employed as seen in FIG. 3, it indirectly heats the bed material (54) and should be operated with a surface temperature as near the lowest melting limit as possible in order to maximize the temperature difference between the heating surface (62) and the bed material (54).

By spraying black liquor (52) above bed (54), the liquor (52) scrubs some of the dust from product gas (58) for assisting in cleaning the gas (58). However, most of the dust particles elutriated from the bed (54) and contained within the product gas (58) is collected in a particulate separator such as a multi-cyclone (18) and recycled back into the bed (54).

Sodium salts, i.e. the reaction product of the black liquor (52), are removed from the gasifier bed (54) primarily as sodium carbonate with some sodium sulfide and sodium sulfate by an overflow pipe (64) and dissolved in tank (66) as best seen in FIG. 2. Also, residual unreacted carbon is also removed from the bed (54).

A filter may be used in conjunction with the tank (66) in a pipe (68) to collect the carbon from the reaction product. The carbon is in turn recycled to bed (54).

FIG. 2 shows the preferred embodiment of the gasifier reactor (10) which contains the bubbling fluidized bed and is constructed of preferably an externally ribbed, stainless steel welded substantially cylindrical vessel. Reactor (10) contains an inlet plenum (11), distributor plate (60) with bubble caps and bed drain(s) (64) for discharge of the solid reaction products. Reaction zone (13) contains the bed (54) and at least one recycle port (20). Optionally, there are observation ports (70) and a drain (72). Reactor (10) also includes a larger diameter drying zone (15) with the black liquor spray assembly (12), fill nozzles (74), and product gas outlet (16).

As mentioned earlier, in the preferred embodiment, a hot fluidizing means (19) enters the plenum (11) at a pressure in the range of 6 to 12 psig with the preferred pressure of about 8 psig and at a temperature ranging from about 800–1250 F. The fluidizing means heats and fluidizes bed (54) at a preferred temperature range of 1000 F.–1250 F. The fluidizing velocity is within the range of 3 to 8 ft/sec with the preferred value of 6 ft/sec. Fluidizing means (19) includes oxygen, air, steam, carbon dioxide, malodorous gas, or mixtures thereof.

FIG. 3 is an alternate embodiment of gasifier reactor (10). In this embodiment, there are two fluidized beds (54), (76) operating in series with respect to gas flow. Throughout the several views, like numerals designate like or similar features. Fluid bed (76) provides the fluidizing means (19) and may be used in conjunction with or as a substitute for air/steam heater (14).

The fluidizing gases for the gasification reactions enter the process as relatively cold streams at the lower fluidized bed (76). Air (2) is provided to the bed (76) as a fluidizing gas at approximately 250° F. Air at this temperature is obtained in a steam coiled preheater (46) with 50 PSI steam. Processed steam (3) is also provided to the reactor (10) for the bed (76). The processed steam (3) is generated using a flue gas waste heat boiler (48). Both the air stream (2) and the steam stream (3) are too cold to add directly to the gasification bed (54). A significant fraction of the total heat input is required just to bring them up to bed temperature. Thus, a heat exchanger (78) is preferably used in bed (76). Any other suitable external heating method may also be used.

The air stream (2) and the steam stream (3) are heated to the operating temperature of the bed (76) which is approximately 1000 F. to 1400 F. but in some circumstances may be as low as 800 F., through the use of indirect heat exhaust provided by heat exchanger (78). The fluid stream (19) will very rapidly cool or heat to the actual operating temperature of the upper fluidized bed (54) but does not heat the upper bed (54) above the particle melting point.

The lower fluidized bed (76) uses inert bed materials such as calcium sulfate, sand or aluminum oxides which have a high melting temperature. Because there is no danger of melting the bed material, the surface temperature of the lower heat exchanger (78) can be much higher than the temperature of the upper heat exchanger (62). If desired, heat input (79) to the lower external heat exchanger (78) can be supplied by burning a fraction of the product gas (58) within the heat exchanger (78), or any known combustion source like a natural gas burner can be employed.

Any unreacted carbon removed by the filter at the dissolving tank (66) can be recycled back into the system. By recycling the carbon, an improvement in the overall process gasification efficiency for the reactor (10) is provided. This recycling not only solves the problem of disposing of dregs but also maintains a high thermal efficiency for the reactor (10).

The present invention maintains good heating value for the product gas stream (58) produced by reactor (10) while operating as a simple air, and/or steam blown gasifier which requires minimum direct heat input to the fluidized beds through the mixing of air and steam.

Another method of increasing the heating value of the product fuel gas (58) is to use pure oxygen (4) if available, as the gasifying medium in place of the air (2). The use of oxygen increases the caloric value of the product gas. However, the use of pure oxygen (4) as a supplement to the air stream (2) results in oxygen enriched air and gains the advantage of increased heating value of the product gas (58) while maintaining adequate fluidization of the reactor (10).

Using pure oxygen (4) to enrich the gasifying air stream (2) is practicable in many paper mills. Oxygen bleaching is also widely used to replace chlorine bleaching in these mills. The use of oxygen in waste water aeration systems is not uncommon; and the additional oxygen demand of the gasifier should be enough for the paper mill to utilize an on-site air separation plant which would lower the overall oxygen costs for the paper mill.

Another source of air for the gasifier (10) is a malodorous gas source (5) such as a high volume low concentration (HVLC) waste gas which is a stream which originates in the vents and hoods at many locations of the mill. The waste gas stream (5) contains low concentrations of many malodorous gases such as mercaptans and is generally saturated with water vapor. These gases are normally disposed of by incineration or as air supply to the lime kiln but are normally a thermal drain due to their high moisture content. Because both steam and air are used in the present invention, the malodorous gases 5 provide a means for solving the disposal problem encountered by the paper mills.

Additionally, a low volume high concentration (LVHC) steam source can also be used as an oxygen source for the reactor (10). This offers the advantage of capturing additional sulfur and reducing mill sulfur make-up.

The present invention provides a division of the indirect external heat input between the low temperature gasifier bed (54) and the high temperature air/steam heater (14) or lower fluidized bed (76). The present invention uses a blend of air (2), steam (3), and oxygen (4) in order to achieve a higher Btu efficient product gas (58). Carbon filtration and recycling provide an efficient carbon conversion and result in low external heat input.

By burning the ungasified carbon (80) in the lower fluidized bed (76), the indirect heat input is supplemented and increases the overall thermal efficiency of the reactor (10). Additionally, the present invention provides a more efficient paper mill process by using the gasifier (10) in order to dispose of HVLC waste gas 5 produced by the mill.

Returning to FIG. 1, the product gas (58) exits the gasifier reactor (10) and eventually enters the condensing heat exchanger (26).

An aspect of this invention uses a condensing heat exchanger (CHX) (26) as a heat recovery unit and $H_2S$ scrubbing system for the product gas resulting from gasification of fuels containing sulfur particularly black liquor from pulp and paper production. In the preferred embodiment, all surfaces exposed to product gas are covered with an inert substance or coating like polytetrafluoroethylene (PTEF) or other fluoroplastic such as fluorinated ethylene propylene (FEP) or tetrafluoroethylene (TFE). Other inert materials such as glass, graphite, alloys, metals, or other inert coverings can be used. This provides an environment where low temperature heat recovery can be accomplished without concern for gas side corrosion. Therefore, sensible and latent heat can be recovered and added back to the process for increased cycle efficiency. The coating also resists scale formation in the condensing section.

Figure 4:
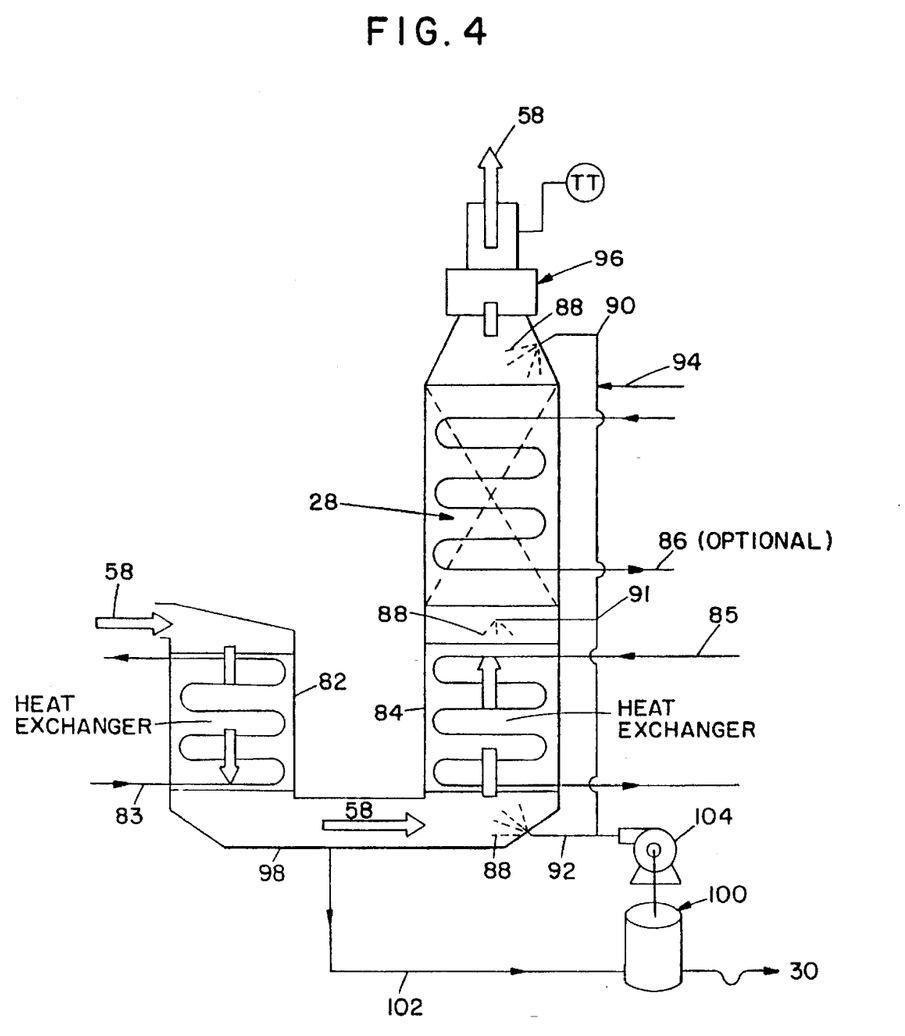
FIG. 4 is a sectional view of a low temperature heat recovery and scrubbing portion of an embodiment of the present invention.

Referring to FIG. 4, the product gas (58) flows through two heat exchangers (82,84) in series followed by a polishing section (28) for final $H_2S$ removal and a water/reactant separator (96). The result is a clean dry product gas.

Product gas enters the first heat exchanger (82) at about 500 F. or less and is cooled to about 200 F.–300 F. Boiler feedwater (83) or process water can be used as the cooling fluid. The heated feedwater can be used elsewhere to generate necessary process steam. Process water could be used elsewhere in the system, or for reheating the product gas as in reheater (32).

Product gas is then channeled to the second heat exchanger (84) section which operates in a condensing mode. Product gas is cooled to below the adiabatic saturation temperature. In this section both particulate and $H_2S$ removal take place. Droplets form around the gas born particulate matter and condense on the cooled fluoroplastic coated tubes. Reagent (88) in the form of typical green liquor is introduced such as by spraying (90) in the polishing section (28) and as required at the inlet (92) to and the exit from (91) the second heat exchanger section (84). Other suitable reagents include soda ash, caustic soda, amines, alkali salts, water-soluble alkali salts, or mixtures thereof. $H_2S$ removal takes place in this condensing section. A sump (98) receives condensed liquid and liquor and supplies it to tank (100) through a pipe (102) where it is recycled via pump (104).

Water preferably at or below 80 F. or air (85) is used as the cooling medium in the second stage heat exchanger (84). The temperature and quantity of water can be varied to control the product gas temperature for optimum $H_2S$ removal and to minimize undersirable $CO_2$ absorption.

The condensing section is followed by an optional polishing section (28) where counter current gas-liquid contacting and final $H_2S$ removal takes place. This section can utilize either a packed tower, trays or other mass transfer device, or an inert heat exchanger as previously described to supply the appropriate amount of mass transfer surface. Fresh chemical make-up (94) is supplied to the upper spray zone (90) to optimize chemical usage and maximize $H_2S$ removal efficiency.

A separator (96) such as a cyclone separator or mist eliminator follows the polishing section to remove mists or fluids from the product gas (58) which exits this section to be processed in the manner previously described in FIG. 1.

Figure 5:
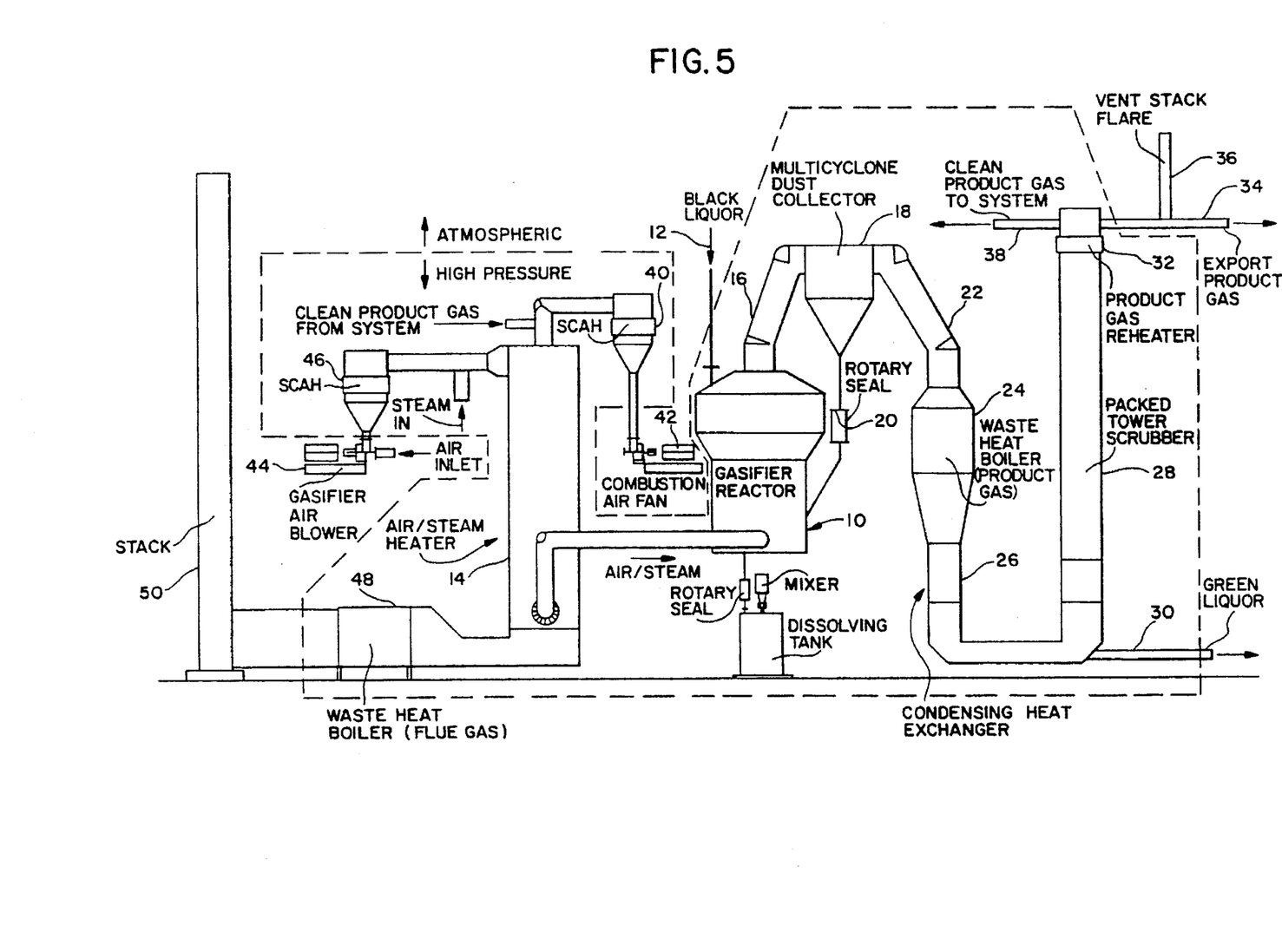
FIG. 5 is a view similar to FIG. 1 illustrating pressurizing means (105).

The system of the present invention is readily extendable to pressurized operation. Pressuring the system will result in higher capacity/volume designs. The entire system can be pressurized in one of two ways. The first option is to pressurize the entire system consisting of pressure vessels for each subsystem or component. The second option is to employ low pressure components or subsystems surrounded by a larger pressure vessel (105) as seen in FIG. 5 to provide a high pressure environment. High pressure operation is desirable and often necessary for use with a gas turbine. Of course, the exported product gas may be pressurized just prior to use with a gas turbine.

Other advantages of the present invention include but are not limited to the following.

The system of the present invention is self-contained, i.e., for steady state operation (not start up/shut down). The system takes in black liquor, air, and electricity for fan/blower and discharges green liquor and product gas. Feedwater intake and steam production are quite minimal. The system is adaptable to a variety of liquors (from wood, bagasse, straw etc.) and can be used to produce product gases of varying quality. There are no heating surfaces in contact with the bubbling fluid reaction bed in the embodiment of FIG. 2 during normal operation. Some heaters may be used for start-up. The low temperature design eliminates the formation of smelt and the possibility of smelt-water reactions, reduces fouling potential, and reduces the need for cooling the gasifier vessel. There are no moving parts nor mechanical devices except the fans, blowers, and rotary seals. The present invention includes reheat of the product gas for transport. The reheated gas will also facilitate the combustion of the low BTU gas in the boiler.

The advantages of the CHX scrubbing system in the present invention include but are not limited to the following. It combines heat recovery with $H_2S$ removal. Sensible and latent heat are recovered for improved cycle efficiency. It removes fine particulate. There is selective $H_2S$ absorption by controlling scrubbing conditions such as temperature and chemistry. There is selective $H_2S$ absorption by controlling chemical make-up location. The system provides corrosion resistant gas side heat transfer and mass transfer surfaces. The system also provides scale resistant gas side heat transfer and mass transfer surfaces. It allows for boiler feedwater heating for improved efficiency.

While specific embodiments of the invention have been shown and described in detail to illustrate the application of the principles of the invention, it will be understood that the invention may be embodied otherwise without departing from such principles.

What is claimed is:

1. A system for producing a product gas, comprising:
   a gasifier reactor having a fluidizing bed located therein with an inlet and an outlet;
   direct means for heating and simultaneously fluidizing the fluidizing bed in said gasifier reactor to a temperature ranging from about 800° F. to 1400° F., said direct heating means providing a heated fluid stream which is used for both heating and fluidizing the bed of said gasifier reactor;
   means for introducing a residual waste liquor into said gasifier reactor to produce a product gas stream;
   dust collector means positioned downstream of said gasifier reactor for removing dust from the product gas stream;
   first heat exchanger means positioned downstream of said dust collector means for recovering heat from the product gas, said first heat exchanger means having tubes covered with an inert covering, said tubes being constructed to be cooled and exposed to the product gas stream to cool the product gas to a first selected temperature range;
   second heat exchanger means operating in a condensing mode positioned downstream of said first heat exchanger means and connected in series by a duct thereto for cooling the product gas to a temperature below an adiabatic saturation temperature of the product gas, said second condensing heat exchanger means having tubes covered with an inert covering, said tubes being constructed to be cooled and exposed to the product gas stream; and
   means for spraying a reagent into the product gas stream in an inlet and an exit of said second condensing heat exchanger means for removing an acid gas and particulate from the product gas.

2. A system as recited in claim 1, wherein said direct heating means comprises a heater constructed to supply the heated fluid stream into a plenum of said gasifier reactor.

3. A system as recited in claim 2, further comprising waste heat recovery means for recovering heat from combustion gas of said heater.

4. A system as recited in claim 1, wherein the gasifier reactor further comprises first and second fluidizing beds, said second fluidizing bed being positioned below said first fluidizing bed inside said gasifier reactor, said second fluidizing bed supplying a heated fluid stream to said first fluidizing bed for heating and simultaneously fluidizing said first fluidizing bed.

5. A system as recited in claim 4, further comprising at least one heat exchanger means situated in the second fluidizing bed for indirectly heating the fluidizing bed.

6. A system as recited in claim 4, further comprising at least one heat exchanger means situated in the first fluidizing bed for indirectly heating the fluidizing bed.

7. A system as recited in claim 1, further comprising means for pressurizing the system to a selected pressure above one atmosphere.

8. A system as recited in claim 7, wherein said pressurizing means includes a pressure vessel surrounding the system.

9. A system as recited in claim 1, further comprising means for pressurizing the clean product gas for direct firing in a turbine.

10. A system for providing a product gas as recited in claim 1, further comprising heat recovery means positioned downstream of said dust collector means and upstream of said first and second condensing heat exchanger means for recovering heat from the product gas.

11. A system as recited in claim 1, further comprising means for reheating the product gas to facilitate transport and combustion.

* * * * *